No. 621,868. Patented Mar. 28, 1899.
J. C. STRATTON.
TRACE SUPPORT.
(Application filed Jan. 14, 1899.)
(No Model.)
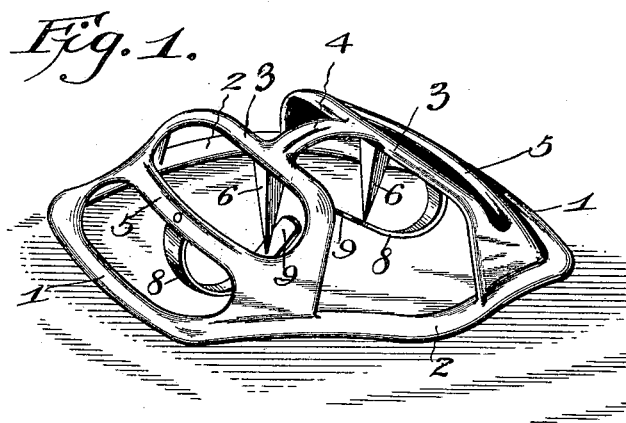
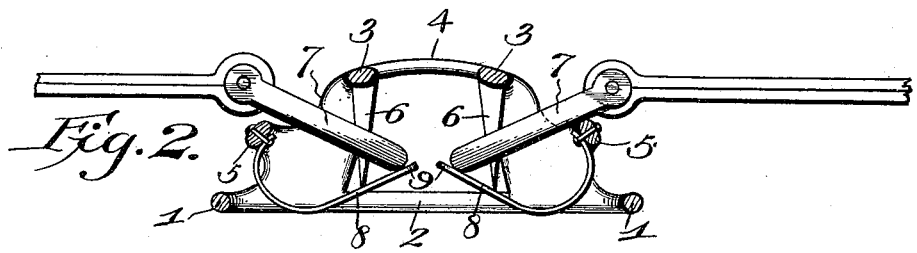
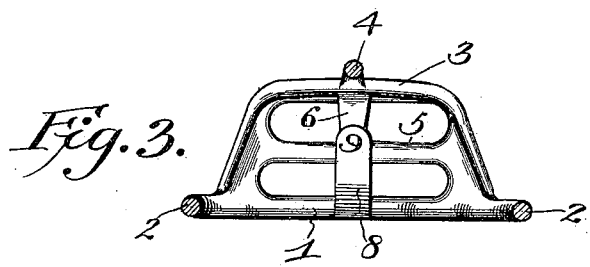
Witnesses  John C. Stratton, Inventor.
By his Attorneys,
C. A. Snow & Co.

UNITED STATES PATENT OFFICE.

JOHN CURTICE STRATTON, OF OXFORD, KANSAS, ASSIGNOR OF ONE-THIRD TO ROBERT S. STRATTON, OF SAME PLACE.

TRACE-SUPPORT.

SPECIFICATION forming part of Letters Patent No. 621,868, dated March 28, 1899.

Application filed January 14, 1899. Serial No. 702,178. (No model.)

*To all whom it may concern:*

Be it known that I, JOHN CURTICE STRATTON, a citizen of the United States, residing at Oxford, in the county of Sumner and State of Kansas, have invented a new and useful Trace-Carrier, of which the following is a specification.

This invention relates to trace-carriers; and the object thereof is to provide such a device with means whereby the free ends of traces may be held up when not in use and prevented from hanging down and catching in objects on the ground or interfering with the free movement of the animal.

To this end the present invention consists in the combination and arrangement of parts, as will be hereinafter more fully described, and particularly pointed out in the claim.

In the drawings, Figure 1 is a perspective view of the trace-carrier. Fig. 2 is a longitudinal sectional view thereof, showing the ends of the traces supported thereby. Fig. 3 is a transverse sectional view thereof.

Corresponding parts are designated by like characters of reference in all the figures of the drawings.

Referring to the accompanying drawings, the carrier is of skeleton form, being approximately oblong in shape, having bowed ends 1 and sides 2, forming the base thereof. At the juncture of the sides and ends arched braces 3 are provided, and these braces are connected by a longitudinal arm 4. Each arched brace is provided with a guard 5, and the arches are each provided with a depending prong or hook 6. This is an ordinary form of carrier, being mounted upon the hips of the animal, having the back-strap connected to one side 2, the crupper to the other side, and the hip-straps to the respective ends of the carrier.

As shown in Fig. 2, the cockeyes 7 of the free ends of the traces are adapted to be passed between the guards 5 and the arched braces 3 upon the respective sides of the carrier and engaged about the respective hooks or prongs 6, whereby the ends of the traces are held up from the ground. In this construction the cockeyes frequently become disengaged from the prongs 6 by the movement of the animal, and the traces will then drop to the ground. The present invention is designed to obviate this difficulty by providing flat bowed springs 8. These springs are connected to the respective guards 5, being bowed downward and overlapping the ends of the respective prongs and in engagement with the ends thereof. The cockeyes are introduced between the arches and guards, as heretofore described, pressing down the respective springs 8 away from the ends of the prongs, whereby the cockeyes may be engaged about the prongs. When the cockeyes are thus engaged, the springs resume their normal position, the free ends 9 overlapping the ends of the prongs and forming a stop to prevent the cockeyes from being accidentally dropped down and displaced from the prongs.

It will be noted that no change or alteration is made in the frame of the carrier, the spring being the only additional element. The spring is mounted within the frame of the carrier, being out of the way so as not to engage with the reins or any other part of the harness.

Changes in the form, proportion, and minor details of construction and arrangement may be made without departing from the spirit and scope or sacrificing any of the advantages of the invention.

Having thus described the invention, what is claimed is—

In combination with a trace-carrier provided with a skeleton frame having arched braces, guards extending transversely across the braces, and prongs depending from the arched braces, the flat bowed springs connected to the guards and extending inwardly therefrom, each spring engaging the free end of its respective prong and extending beyond and overlapping the same, the cockeyes on the traces being adapted to be introduced between the springs and the free ends of the prongs to engage about the latter, and the overlapping free ends of the springs forming stops to prevent the cockeyes from being accidentally displaced from the prongs, substantially as shown and described.

In testimony that I claim the foregoing as my own I have hereto affixed my signature in the presence of two witnesses.

JOHN CURTICE STRATTON.

Witnesses:
FRED BARNES,
B. F. KELSEY.